(12) United States Patent
Hoehn

(10) Patent No.: US 9,562,634 B2
(45) Date of Patent: Feb. 7, 2017

(54) PIPE RETAINER

(71) Applicant: DELPHI TECHNOLOGIES, INC., Troy, MI (US)

(72) Inventor: Garrett W. Hoehn, Kenmore, NY (US)

(73) Assignee: MAHLE International GmbH, Stuttgart (DE)

( * ) Notice: Subject to any disclaimer, the term of this patent is extended or adjusted under 35 U.S.C. 154(b) by 358 days.

(21) Appl. No.: 14/465,938

(22) Filed: Aug. 22, 2014

(65) Prior Publication Data

US 2016/0053924 A1 Feb. 25, 2016

(51) Int. Cl.
*F16L 3/04* (2006.01)
*F16L 19/04* (2006.01)
*F16L 21/08* (2006.01)
*B60H 1/04* (2006.01)
*B60H 1/00* (2006.01)
*F01P 11/04* (2006.01)
*F16L 37/12* (2006.01)
*F16L 37/56* (2006.01)
(Continued)

(52) U.S. Cl.
CPC ........... *F16L 19/04* (2013.01); *B60H 1/00571* (2013.01); *B60H 1/04* (2013.01); *F01P 11/04* (2013.01); *F16L 3/04* (2013.01); *F16L 21/08* (2013.01); *F16L 37/1225* (2013.01); *F16L 37/56* (2013.01); *F16L 39/00* (2013.01); *F28F 9/0248* (2013.01); *F28F 9/0258* (2013.01); *F28F 2275/08* (2013.01)

(58) Field of Classification Search
CPC ........ F16L 19/04; F16L 39/00; F16L 37/1225; F16L 37/56; F16L 3/04; F16L 21/08; F28F 9/0248; F28F 9/0258; F28F 2275/08; F01P 11/04; B60H 1/00571; B60H 1/04; Y10T 24/3431; Y10T 24/344
See application file for complete search history.

(56) References Cited

U.S. PATENT DOCUMENTS

| 534,345 | A | * | 2/1895 | Nilsson | .................... B23Q 3/00 |
| | | | | | 269/128 |
| 3,421,187 | A | * | 1/1969 | Ryder | .................... F16L 3/2235 |
| | | | | | 248/74.3 |

(Continued)

FOREIGN PATENT DOCUMENTS

| DE | 3047867 A1 | 7/1982 |
| DE | 102011013954 A1 | 9/2012 |

(Continued)

*Primary Examiner* — David E Sosnowski
*Assistant Examiner* — James Linford
(74) *Attorney, Agent, or Firm* — Brinks Gilson & Lione

(57) ABSTRACT

A pipe for simultaneously retaining a first pipe to a first port and a second pipe to a second port includes a first yoke for receiving the first pipe and the first port to retain the first pipe to the first port; a second yoke for receiving the second pipe and the second port to retain the second pipe to the second port; and a hinge joining the first yoke to the second yoke such that the hinge allows the first yoke to pivot relative to the second yoke about a hinge axis between 1) a disassembled position which allows removal of the pipe retainer from the first pipe, the first port, the second pipe, and the second port and 2) an assembled position which prevents removal of the pipe retainer from the first pipe, the first port, the second pipe, and the second port.

14 Claims, 7 Drawing Sheets

(51) Int. Cl.
*F16L 39/00* (2006.01)
*F28F 9/02* (2006.01)

(56) References Cited

U.S. PATENT DOCUMENTS

| | | | | |
|---|---|---|---|---|
| 3,537,150 A | * | 11/1970 | Emberson | F16B 2/10 24/324 |
| 3,568,264 A | * | 3/1971 | Crist et al. | E04G 7/08 24/517 |
| 4,089,087 A | * | 5/1978 | Heitman | F16L 3/2235 24/329 |
| 5,170,841 A | | 12/1992 | Briet | |
| 5,180,006 A | | 1/1993 | Marsais et al. | |
| 5,556,137 A | | 9/1996 | Ream | |
| 7,604,258 B2 | | 10/2009 | Getto et al. | |
| 2002/0117850 A1 | * | 8/2002 | Wood | B60H 1/00571 285/124.1 |
| 2006/0185167 A1 | | 8/2006 | Lippa et al. | |
| 2008/0106095 A1 | | 5/2008 | Harris et al. | |
| 2008/0129043 A1 | * | 6/2008 | Holt | F16L 39/00 285/93 |
| 2008/0264605 A1 | | 10/2008 | Tchang et al. | |

FOREIGN PATENT DOCUMENTS

| | | |
|---|---|---|
| EP | 0781952 A1 | 7/1997 |
| EP | 1821058 A1 | 8/2007 |
| EP | 2065628 A2 | 6/2009 |
| FR | 2808586 A1 | 11/2001 |

\* cited by examiner

PIPE RETAINER

TECHNICAL FIELD OF INVENTION

The present invention relates to a pipe retainer for simultaneously retaining a first pipe to a first port and a second pipe to a second port; more particularly to such a pipe retainer which includes a first yoke for retaining the first pipe to the first port and a second yoke for retaining the second pipe to the second port; and still even more particularly to such a pipe retainer which includes a hinge joining the first yoke to the second yoke such that the hinge allows the first yoke to pivot relative to the second yoke about a hinge axis between a disassembled position and an assembled position.

BACKGROUND OF INVENTION

Devices, for example heater cores of motor vehicles which extract heat from coolant used to cool an internal combustion engine of the motor vehicle, are known to have a first port connected to a first pipe and a second port connected to a second pipe. In the example of a heater core, the first pipe may supply relatively hot coolant to the heater core through the first port while the coolant is returned to the internal combustion engine at a lower temperature through the second port and the second pipe. An O-ring may be used to prevent the coolant from escaping through the connections formed between each of the pipes and their respective ports. In order to retain the first pipe to the first port, it is known to use a collar to engage features of the first pipe and the first port, thereby preventing the first pipe from separating from the first port. The collar includes semicircular halves which include a hinge and a snap lock diametrically opposing the hinge such that the collar completely surrounds the first port and the second port when it is installed. Another collar is similarly used to retain the second pipe to the second port. While the collar may be effective for retaining the pipe to the port, it may be difficult to verify that the snap lock has been assembled successfully and special manufacturing tools and gages may be needed to snap the snap lock of the collar together and to verify that the snap lock has been assembled successfully. Additionally, since the collar completely surrounds the pipe and the port, fixturing may not be permitted to hold the pipe to the port while the collar is being assembled to the pipe and to the port, thereby allowing a potential for the pipe to separate from the port before the collar can be assembled thereto. Finally, the snap lock may be difficult to disassemble if the pipe needs to be separated from the port for service or replacement of the heater core.

What is needed is a pipe retainer which minimizes or eliminates one or more of the shortcomings as set forth above.

SUMMARY OF THE INVENTION

Briefly described, a pipe retainer is provided for simultaneously retaining a first pipe to a first port and a second pipe to a second port that is a fixed distance from the first port. The pipe retainer includes a first yoke for receiving the first pipe and the first port to retain the first pipe to the first port; a second yoke for receiving the second pipe and the second port to retain the second pipe to the second port; and a hinge joining the first yoke to the second yoke such that the hinge allows the first yoke to pivot relative to the second yoke about a hinge axis between 1) a disassembled position which allows removal of the pipe retainer from the first pipe, the first port, the second pipe, and the second port and 2) an assembled position which prevents removal of the pipe retainer from the first pipe, the first port, the second pipe, and the second port.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

This invention will be further described with reference to the accompanying drawings in which.

DETAILED DESCRIPTION OF INVENTION

Figure 1:
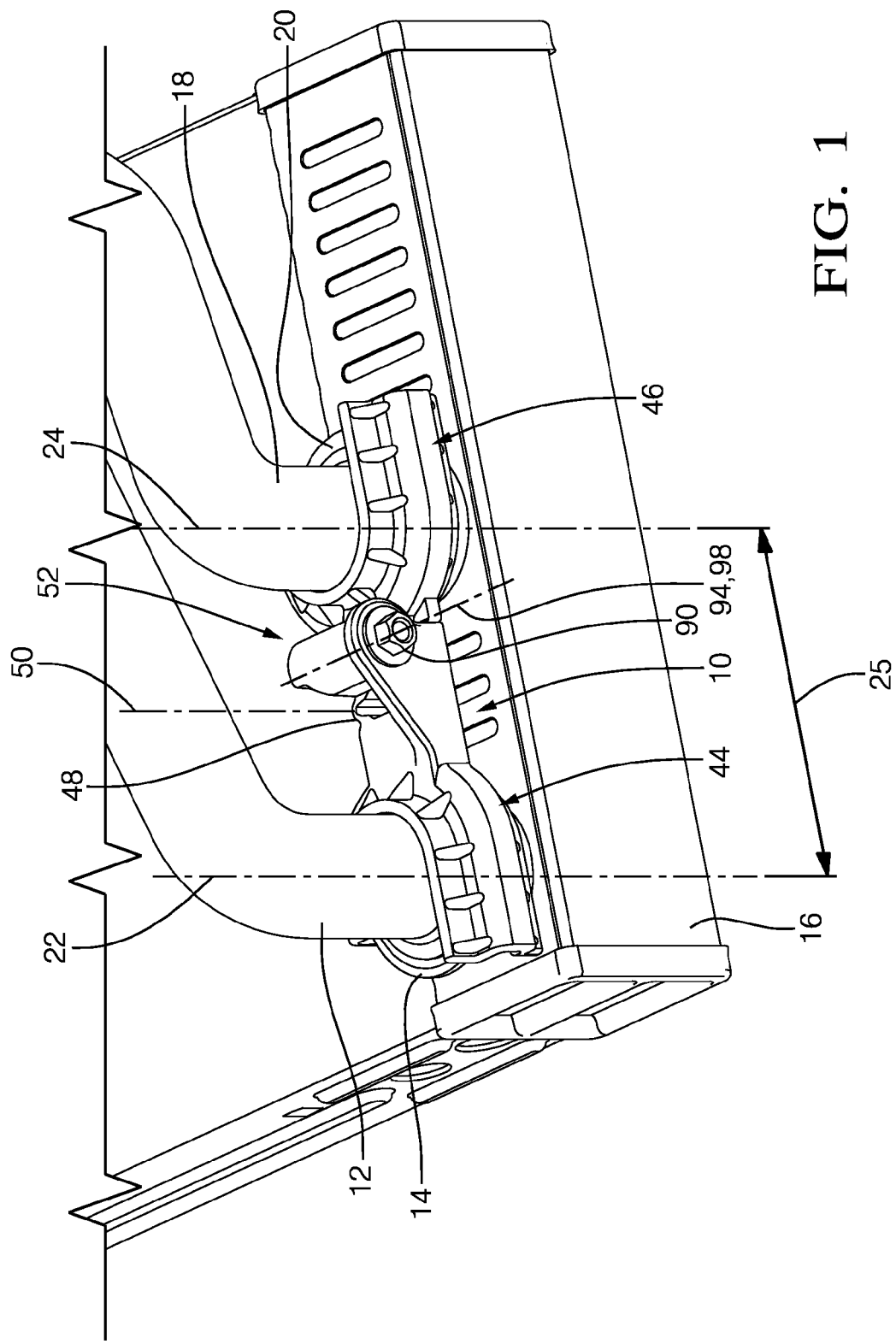
FIG. 1 is an isometric view of a first pipe retained to a first port and second pipe retained to a second port with a pipe retainer in accordance with the present invention.

In accordance with a preferred embodiment of this invention and referring to FIGS. 1-4, a pipe retainer 10 is shown which is used to simultaneously retain a first pipe 12 to a first port 14 of a device 16 and a second pipe 18 to a second port 20 of device 16. First port 14 is centered about a first port axis 22 while second port 20 is centered about a second port axis 24 such that first port axis 22 is parallel to second port axis 24 and such that first port axis 22 is separated from second port axis 24 by a predetermined distance 25. As shown, first port 14 and second port 20 may lie in a common plane 26. By way of non-limiting example only, device 16 may be a heat exchanger, and more specifically, a heater core of a motor vehicle (not shown) which receives relatively hot coolant through first pipe 12 from an internal combustion engine (not shown) of the motor vehicle and extracts heat from the coolant to alter the temperature of a passenger compartment (not shown) of the motor vehicle and returns the coolant at a lower temperature to the internal combustion engine through second pipe 18.

First port 14 and second port 20 may be substantially the same, and for brevity, first port 14 and second port 20 will hereinafter be referred to generically as port 14, 20 unless reference is specifically being made to first port 14 or second port 20. Port 14, 20 is defined by a port first section 28 that is proximal to device 16 and a port second section 30 that is distal from device 16 and coaxial with port first section 28. Port first section 28 is smaller in diameter than port second section 30 and consequently a port shoulder 32 is defined where port first section 28 meets port second section 30. A port flange 34 that is annular in shape extends radially outward from the end of port second section 30 that is opposite of port shoulder 32. Port 14, 20 may be made of any material that is compatible with the fluid it will carry and the environment it will be subjected to in use, and may be, by way of non-limiting example only, metal that is formed in a deep drawing process.

First pipe 12 and second pipe 18 may be substantially the same, and for brevity, first pipe 12 and second pipe 18 will hereinafter be referred to generically as pipe 12, 18 unless reference is specifically being made to first pipe 12 or second pipe 18. Pipe 12, 18 includes a pipe first section 36 which is received within port 14, 20 in use and a pipe second section 38 which extends from pipe first section 36 in a direction that is away from port 14, 20 and device 16. Pipe first section 36 is sized to fit closely within port first section 28, thereby substantially preventing pipe 12, 18 from tipping relative to port 14, 20 and defining an annular space between pipe first section 36 and port second section 30 for receiving an O-ring 40. O-ring 40 radially seals between the outer circumference of pipe first section 36 and the inner circumference of port second section 30 in order to prevent fluid that is passing through pipe 12, 18 and port 14, 20 from escaping. A pipe bead 42 that is annular in shape extends radially outward from pipe 12, 18 generally where pipe first section 36 meets pipe second section 38. Pipe bead 42 is sized to be larger in diameter than the inner circumference of port second section 30, consequently, pipe bead 42 limits the extent to which pipe first section 36 is inserted into port 14, 20. Pipe 12, 18 may be made of any material that is compatible with the fluid it will carry and the environment it will be subjected to in use, and may be, by way of non-limiting example only, metal.

Figure 3:
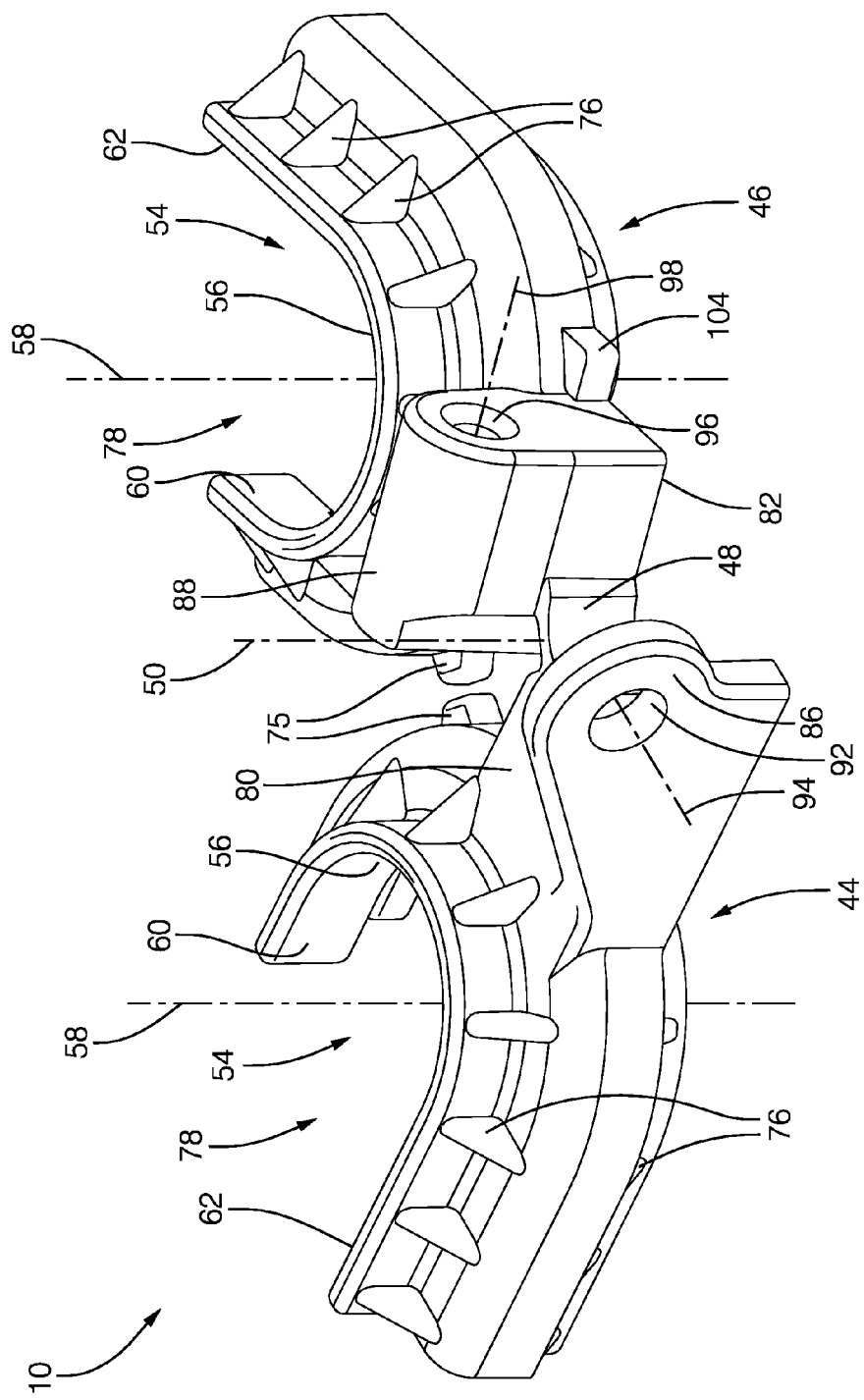
FIG. 3 is an isometric view of the pipe retainer in accordance with the present invention shown in a disassembled position.

Pipe retainer 10 generally includes a first yoke 44 for receiving first pipe 12 and first port 14 to retain first pipe 12 to first port 14, a second yoke 46 for receiving second pipe 18 and second port 20 to retain second pipe 18 to second port 20, and a hinge 48 joining first yoke 44 to second yoke 46. Hinge 48 allows first yoke 44 to pivot relative to second yoke 46 about a hinge axis 50 between 1) a disassembled position which allows removal of pipe retainer 10 from first pipe 12, first port 14, second pipe 18, and second port 20 and 2) an assembled position which prevents removal of pipe retainer 10 from first pipe 12, first port 14, second pipe 18, and second port 20. Hinge axis 50 is substantially parallel to first port axis 22 and second port axis 24 when pipe retainer 10 is installed. Pipe retainer 10 also generally includes a hinge lock 52 which selectively prevents hinge 48 from allowing first yoke 44 to pivot relative to second yoke 46 in the assembled position. With the exception of a portion of hinge lock 52 as will be described later, pipe retainer 10 may be formed as a single unitary piece, by way of non-limiting example only, from a polymer formed in an injection molding operation. Again by way of non-limiting example only, the polymer may be impact modified nylon. Pipe retainer 10 may be injection molded in the disassembled position as shown in FIG. 3.

First yoke 44 and second yoke 46 may be substantially the same in many respects, and for brevity, first yoke 44 and second yoke 46 will hereinafter be referred to generically as yoke 44, 46 unless reference is specifically being made to first yoke 44 or second yoke 46. Yoke 44, 46 defines an opening 54 that is non-continuously bounded and having a semicircular portion 56 centered about a yoke axis 58, a first straight portion 60 extending tangentially from semicircular portion 56, and a second straight portion 62 extending tangentially from semicircular portion 56 such that first straight portion 60 and second straight portion 62 are substantially parallel to each other. Second straight portion 62 may be longer than first straight portion 60 as shown, the significance of which will be made more clear later. Opening 54 has an opening upper portion 64 which is sized to receive pipe second section 38 in use and an opening lower portion 66 which is sized to receive port second section 30 in use. Since pipe second section 38 is smaller in diameter than port second section 30, opening upper portion 64 is smaller than opening lower portion 66. A yoke groove 68 is defined between opening upper portion 64 and opening lower portion 66 such that yoke groove 68 includes a groove upper surface 70 that lies in a plane that is perpendicular to yoke axis 58, a groove lower surface 72 that is parallel to groove upper surface 70 and spaced apart from groove upper surface 70 in the direction of yoke axis 58, and a groove connecting surface 74 that connects groove upper surface 70 to groove lower surface 72.

Yoke 44, 46 may include a disassembled travel stop 75 such that disassembled travel stop 75 of first yoke 44 and disassembled travel stop 75 of second yoke 46 abut to prevent further pivoting of first yoke 44 relative to second yoke 46 in a direction that is away from the assembled position when pipe retainer 10 is in the disassembled position.

A plurality of ribs 76 may be provided to add support to the portions of yoke 44, 46 that define opening upper portion 64 and opening lower portion 66. Yoke groove 68 is open toward opening 54, extends the entire length of semicircular portion 56, first straight portion 60, and second straight portion 62, and is sized to receive port flange 34 therein in use. Since opening 54 is non-continuously bounded, an opening gap 78 is defined between the free ends of first straight portion 60 and second straight portion 62, thereby allowing yoke 44, 46 to be installed on pipe 12, 18 and port 14, 20 in a lateral motion, i.e. in a motion that is perpendicular to yoke axis 58.

Figure 4:
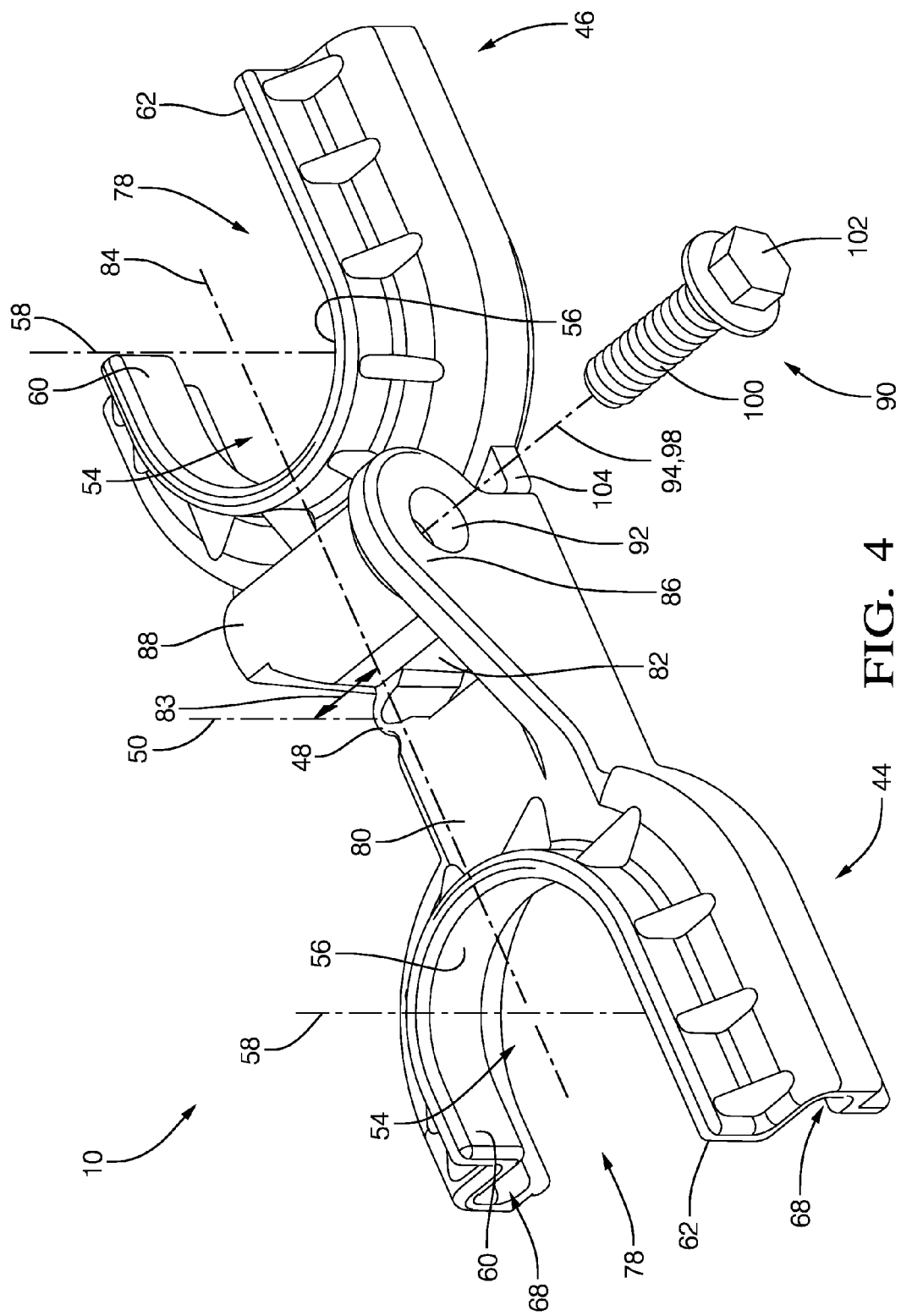
FIG. 4 is an isometric view of the pipe retainer in accordance with the present invention shown in an assembled position.

First yoke 44 includes a first yoke leg 80 extending outward therefrom while second yoke 46 includes a second yoke leg 82 extending outward therefrom such that hinge 48 connects first yoke leg 80 to second yoke leg 82. As shown, hinge 48 may preferably be a living hinge which is a thin and flexible portion of pipe retainer 10, thereby allowing pipe retainer 10 to be molded as a single piece. While first yoke leg 80 and second yoke leg 82 have been illustrated as being substantially equal in length, it should now be understood that first yoke leg 80 and second yoke leg 82 may be substantially different in length. As best shown in FIG. 4, hinge axis 50 may preferably be laterally offset by a distance 83 from an assembled centerline 84 which extends perpendicularly between yoke axis 58 of first yoke 44 and yoke axis 58 of second yoke 46 when pipe retainer 10 is in the assembled position. While hinge axis 50 is illustrated as being substantially the same distance from yoke axis 58 of first yoke 44 and yoke axis 58 of second yoke 46, it should now be understood that the distance from hinge axis 50 to yoke axis 58 of first yoke 44 may be different than the distance from hinge axis 50 to yoke axis 58 of second yoke 46.

Hinge lock 52 comprises a lock tab 86 that is integrally molded with first yoke leg 80, a lock boss 88 that is integrally molded with second yoke leg 82, and a fastener 90 which secures lock tab 86 to lock boss 88 when pipe retainer 10 is in the assembled position. Lock tab 86 includes a clearance hole 92 extending therethrough along a clearance hole axis 94 that may lie in a plane that is substantially perpendicular to yoke axis 58 of first yoke 44. Clearance hole 92 allows a portion of fastener 90 to extend freely therethrough. Lock boss 88 includes a fastener hole 96 extending thereinto along a fastener hole axis 98 that lies in the same plane as clearance hole axis 94 such that clearance hole axis 94 is coincident with fastener hole axis 98 when pipe retainer 10 is in the assembled position.

Fastener 90 may be a removable threaded fastener which includes a shank with external threads 100 and an enlarged head 102. The shank with external threads 100 passes freely through clearance hole 92 and threadably engages fastener hole 96, thereby clamping lock tab 86 between head 102 and lock boss 88 when pipe retainer 10 is in the assembled position and fastener 90 is tightened to threadably engage fastener hole 96. In order to prevent deflection of first yoke 44 relative to second yoke 46, particularly when fastener 90 is being tightened, second yoke leg 82 may be provided with an assembled travel stop 104 which abuts first yoke leg 80 when pipe retainer 10 is in the assembled position. Assembled travel stop 104 abuts first yoke leg 80 in a plane that is substantially parallel to fastener hole axis 98.

Figure 2:
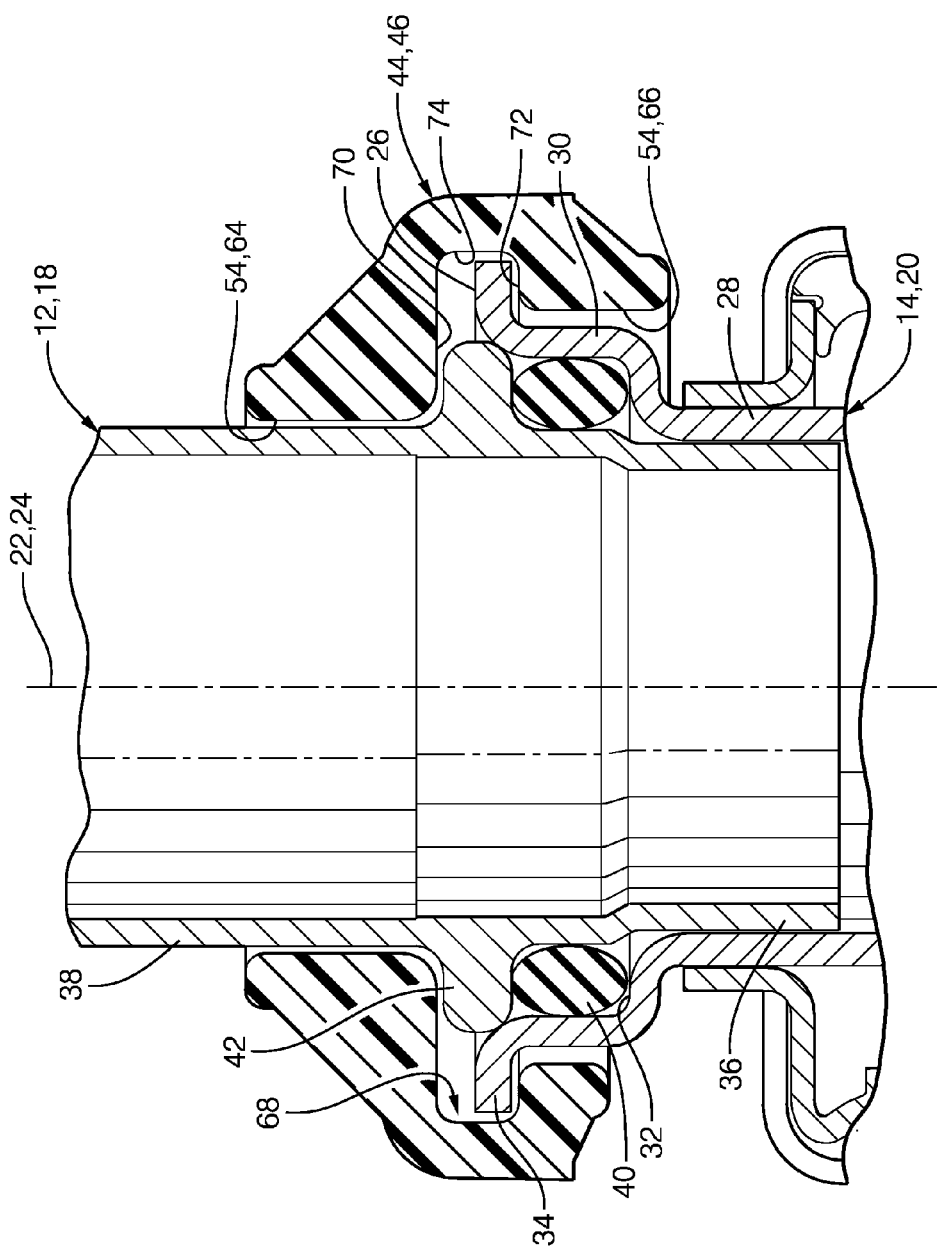
FIG. 2 is an axial cross-sectional view of a pipe, a port, and a yoke of the pipe retainer in accordance with the present invention.

Referring now to FIGS. 1-7, a method will now be described for using pipe retainer 10. Prior to using pipe retainer 10, first pipe 12 is assembled to first port 14 with O-ring 40 radially therebetween as shown in FIG. 2. Similarly, second pipe 18 is assembled to second port 20 with O-ring 40 radially therebetween as shown in FIG. 2. In an assembly line operation, a fixture (not shown) may be used to retain first pipe 12 to first port 14 and to retain second pipe 18 to second port 20 until pipe retainer 10 is installed. Opening gaps 78 of first yoke 44 and second yoke 46 allow the fixture to retain first pipe 12 to first port 14 and to retain second pipe 18 to second port 20 until pipe retainer 10 is installed, thereby eliminating the possibility of first pipe 12 from separating from first port 14 and second pipe 18 from separating from second port 20. Alternatively, when an assembly line operation is not used, for example during service or replacement of device 16, first pipe 12, second pipe 18, or other portions of the system, a service technician may hold first pipe 12 to first port 14 and second pipe 18 to second port 20 until pipe retainer 10 is installed.

Figure 5:
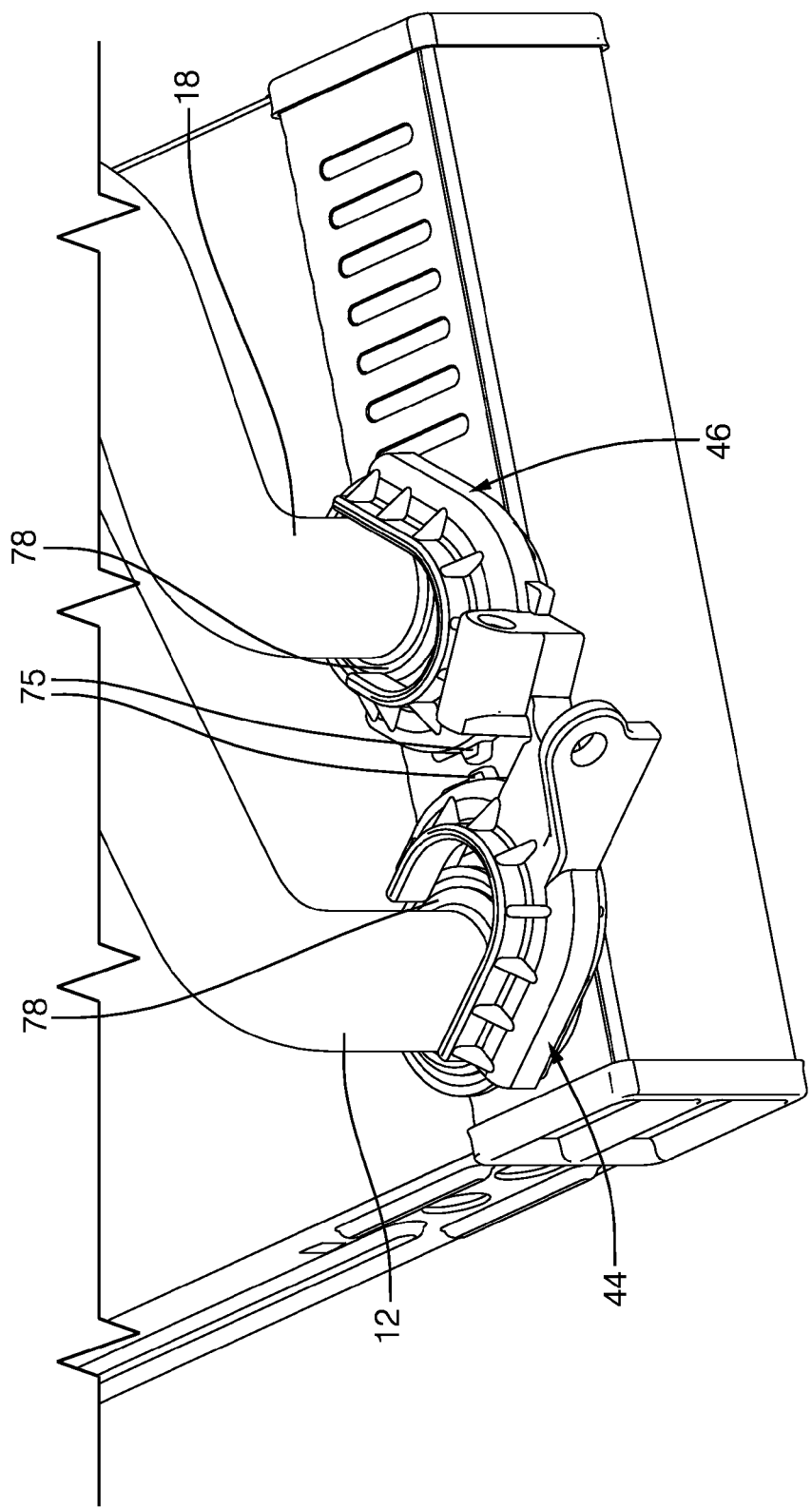
FIG. 5 is an isometric view of the first pipe, the first port, the second pipe, the second port, and the pipe retainer in accordance with the present invention shown in the disassembled position.
Figure 6:
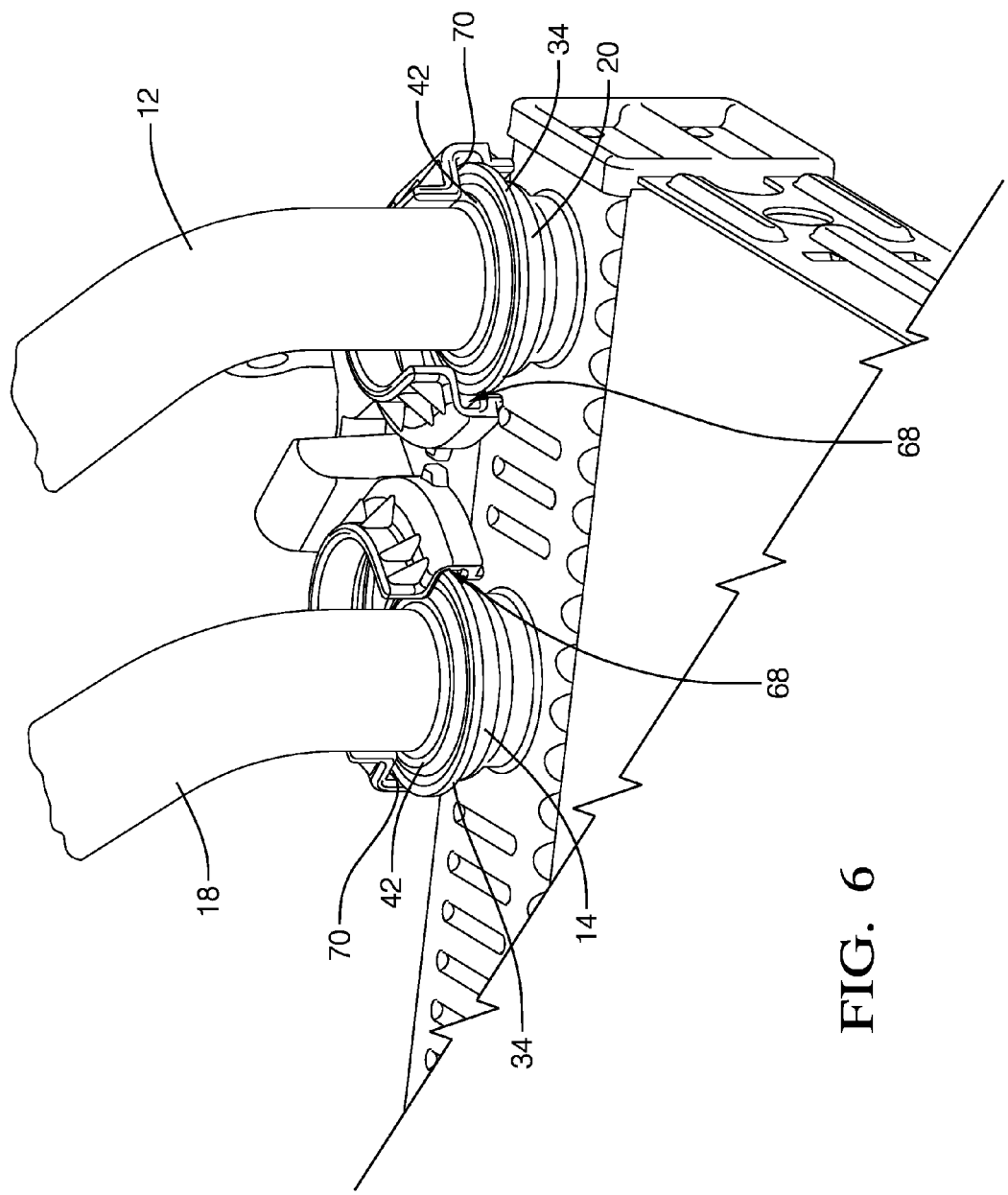
FIG. 6 is the isometric view of FIG. 5 shown from a different perspective.

Next, pipe retainer 10 is taken in the unassembled position as shown in FIG. 3, and first pipe 12 and first port 14 are positioned within opening gap 78 of first yoke 44 and second pipe 18 and second port 20 are positioned within opening gap 78 of second yoke 46 as shown in FIGS. 5 and 6. In other words, first pipe 12 and first port 14 are positioned within opening gap 78 of first yoke 44 and second pipe 18 and second port 20 are positioned within opening gap 78 of second yoke 46 while first yoke 44 is positioned relative to second yoke 46 such that disassembled travel stop 75 of first yoke 44 is touching or in close proximity to disassembled travel stop 75 of second yoke 46. Consequently, each port flange 34 is received within the respective entrance of yoke groove 68 and pipe bead 42 of first pipe 12 is captured between groove upper surface 70 and first port 14 while pipe bead 42 of second pipe 18 is captured between groove upper surface 70 and second port 20. The extended nature of second straight portion 62 of first yoke 44 and second yoke 46 compared to first straight portion 60 aids in aligning pipe retainer 10 to first pipe 12, first port 14, second pipe 18, and second port 20 by acting as a guide or funnel.

Figure 7:
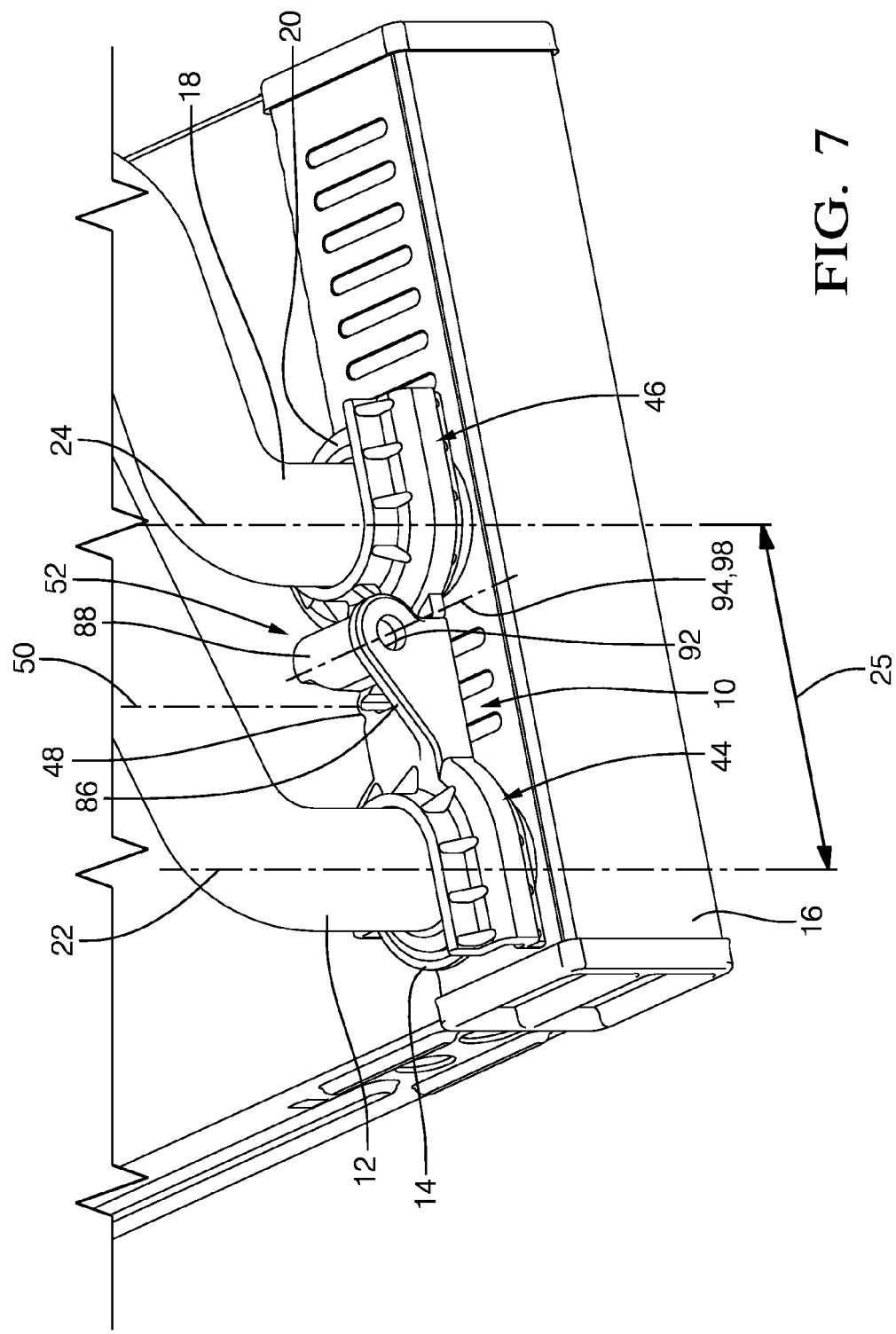
FIG. 7 is the isometric view of FIG. 5 now showing the pipe retainer in the assembled position.

Next, first yoke 44 is pivoted relative to second yoke 46 about hinge axis 50 until lock tab 86 abuts lock boss 88 as shown in FIG. 7, thereby making clearance hole axis 94 substantially coincident with fastener hole axis 98. Since hinge axis 50 is laterally offset from assembled centerline 84, pipe retainer 10 positively snaps into the assembled position when hinge axis 50 passes first port axis 22 and second port axis 24. During the motion of pivoting first yoke 44 relative to second yoke 46, semicircular portion 56 of first yoke 44 is moved closer to first pipe 12 and first port 14 while semicircular portion 56 of second yoke 46 is moved closer to second pipe 18 and second port 20.

In a final step, fastener 90 is driven into fastener hole 96 as shown in FIG. 1, thereby preventing first yoke 44 from pivoting relative to second yoke 46 by clamping lock tab 86 between head 102 and lock boss 88 and also preventing removal of pipe retainer 10 from first pipe 12, first port 14, second pipe 18, and second port 20. In a production environment, simple torque monitoring equipment can be used to drive fastener 90 and verify that pipe retainer 10 has been installed properly. It should be noted that as a result of opening gaps 78, first yoke 44 does not completely surround first pipe 12 and first port 14 and second yoke 46 does not completely surround second pipe 18 and second port 20. It should also be noted that the distance separating yoke axis 58 of first yoke 44 from yoke axis 58 of second yoke 46 is less in the disassembled position than in the assembled position. If first pipe 12 needs to be removed from first port 14 or if second pipe 18 needs to be removed from second port 20, pipe retainer 10 may be removed by reversing the preceding steps, starting with backing out fastener 90 using conventional tools and techniques.

While first port 14 and second port 20 have been described herein as both lying in plane 26, it should now be understood that first port 14 and second port 20 may lie in different parallel planes, thereby requiring first yoke 44 and second yoke 46 to be offset relative to each other.

While hinge lock 52 has been embodied herein as including a fastener 90, which is a threaded fastener, to prevent first yoke 44 from pivoting relative to second yoke 46 about hinge axis 50, it should now be understood that fastener 90 may be omitted by including a snap lock arrangement that is integrally molded with lock tab 86 and lock boss 88.

While this invention has been described in terms of preferred embodiments thereof, it is not intended to be so limited, but rather only to the extent set forth in the claims that follow.

We claim:

1. A pipe retainer for simultaneously retaining a first pipe to a first port and a second pipe to a second port that is a fixed distance from said first port, said pipe retainer comprising:
    a first yoke for receiving said first pipe and said first port to retain said first pipe to said first port;
    a second yoke for receiving said second pipe and said second port to retain said second pipe to said second port; and
    a hinge joining said first yoke to said second yoke such that said hinge allows said first yoke to pivot relative to said second yoke about a hinge axis between 1) a disassembled position which allows removal of said pipe retainer from said first pipe, said first port, said second pipe, and said second port and 2) an assembled position which prevents removal of said pipe retainer from said first pipe, said first port, said second pipe, and said second port;
    a hinge lock which selectively prevents said hinge from allowing said first yoke to pivot relative to said second yoke in said assembled position, wherein the hinge lock includes
    a lock tab on said first yoke, said lock tab including a clearance hole therethrough;

a lock boss on said second yoke, said lock boss including a fastener hole therein that is coaxial with said clearance hole when said pipe retainer is in said assembled position; and a removable fastener for selectively securing said lock tab to said lock boss in said assembled position, said fastener being a threaded fastener which passes through said clearance hole and threadably engages said fastener hole to clamp said lock tab to said lock boss when said pipe retainer is in said assembled position, wherein said first and second yokes are substantially semicircular and, in the assembled position, said first and second yokes are diametrically opposed.

2. The pipe retainer as in claim 1, wherein said second yoke includes an assembled travel stop which abuts said first yoke when said pipe retainer is in said assembled position in order to prevent deflection of said first yoke relative to said second yoke.

3. The pipe retainer as in claim 1, wherein:

said first port is centered about a first port axis;

said second port is centered about a second port axis; and said hinge axis is substantially parallel to said first port axis and said second port axis when said pipe retainer retains said first pipe to said first port and said second pipe to said second port.

4. The pipe retainer as in claim 1, wherein said first yoke does not completely surround said first pipe and said first port in said assembled position and said second yoke does not completely surround said second pipe and said second port in said assembled position.

5. The pipe retainer as in claim 1, wherein:

said first yoke is centered about a first yoke axis that is parallel to said hinge axis;

said second yoke is centered about a second yoke axis that is parallel to said hinge axis; and the distance separating said first yoke axis from said second yoke axis is less in said disassembled position than in said assembled position.

6. The pipe retainer as in claim 5, wherein said hinge axis is laterally offset from an assembled centerline that connects said first yoke axis to said second yoke axis when said pipe retainer is in said assembled position.

7. The pipe retainer as in claim 5, wherein:

said first yoke includes a first yoke opening for receiving said first pipe and said first port therein;

and said second yoke includes a second yoke opening for receiving said second pipe and said second port therein.

8. The pipe retainer as in claim 7, wherein:

said first yoke opening comprises a first yoke semicircular portion that is centered about said first yoke axis; and said second yoke opening comprises a second yoke semicircular portion that is centered about said second yoke axis.

9. The pipe retainer as in claim 8, wherein:

said first yoke further comprises a first yoke first straight portion extending tangentially from said first yoke semicircular portion and a first yoke second straight portion extending tangentially from said first yoke semicircular portion and parallel to said first yoke first straight portion such that a first yoke opening gap is defined between said first yoke first straight portion and said first yoke second straight portion which allows said first pipe and said first port to laterally enter said first yoke opening; and said second yoke further comprises a second yoke first straight portion extending tangentially from said second yoke semicircular portion and a second yoke second straight portion extending tangentially from said second yoke semicircular portion and parallel to said second yoke first straight portion such that a second yoke opening gap is defined between said second yoke first straight portion and said second yoke second straight portion which allows said second pipe and said second port to laterally enter said second yoke opening.

10. The pipe retainer as in claim 9, wherein:

said first yoke second straight portion is longer than said first yoke first straight portion; and said second yoke second straight portion is longer than said second yoke first straight portion.

11. The pipe retainer as in claim 7, wherein:

said first yoke defines a first yoke groove for receiving a first port flange which extends radially outward from said first port; and said second yoke defines a second yoke groove for receiving a second port flange which extends radially outward from said second port.

12. The pipe retainer as in claim 11, wherein:

said first yoke groove is defined in part by a first yoke groove upper surface which lies in a first plane that is perpendicular to said first yoke axis such that a first pipe bead which extends radially outward from said first pipe is captured axially between said first port and said first yoke groove upper surface; and said second yoke groove is defined in part by a second yoke groove upper surface which lies in a second plane that is perpendicular to said second yoke axis such that a second pipe bead which extends radially outward from said second pipe is captured axially between said second port and said second yoke groove upper surface.

13. The pipe retainer as in claim 1, wherein said hinge is a living hinge.

14. The pipe retainer as in claim 1, wherein:

said first yoke includes a first yoke disassembled travel stop;

said second yoke includes a second yoke disassembled travel stop; and said first yoke disassembled travel stop abuts said second yoke disassembled travel stop to prevent further pivoting of said first yoke relative to said second yoke in a direction that is away from said assembled position when said pipe retainer is in said disassembled position, a lock boss on said second yoke, said lock boss including a fastener hole therein that is coaxial with said clearance hole when said pipe retainer is in said assembled position; and a removable fastener for selectively securing said lock tab to said lock boss in said assembled position, said fastener being a threaded fastener which passes through said clearance hole and threadably engages said fastener hole to clamp said lock tab to said lock boss when said pipe retainer is in said assembled position, wherein said first and second yokes are substantially semicircular and, in the assembled position, said first and second yokes are diametrically opposed.

* * * * *